Aug. 18, 1953 — C. EAMES — 2,649,136
FURNITURE SHOCK MOUNT CONSTRUCTION
Filed March 1, 1947 — 2 Sheets-Sheet 1
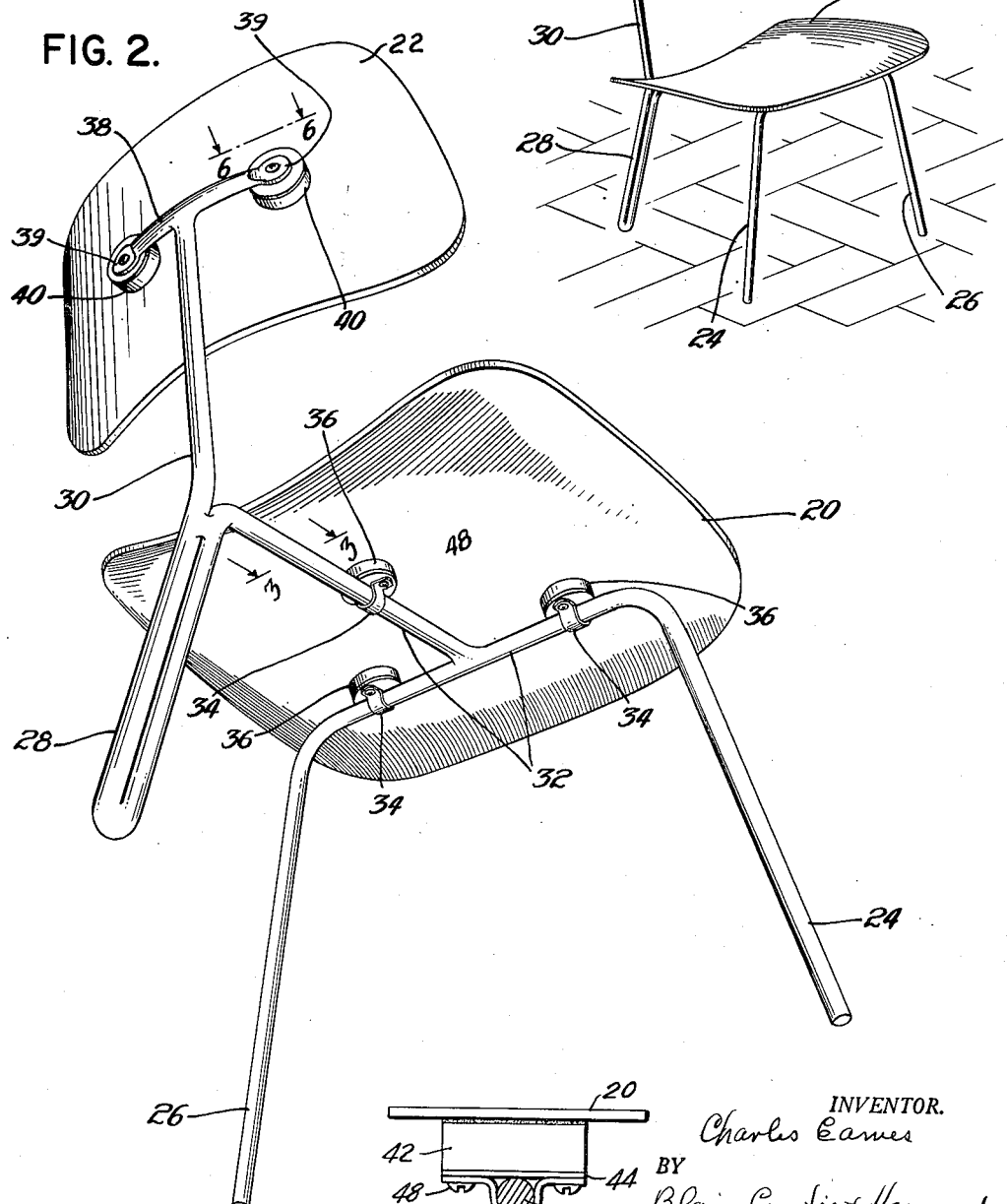
INVENTOR.
Charles Eames
BY Blair Curtis + Hayward
ATTORNEY Aug. 18, 1953 — C. EAMES — 2,649,136
FURNITURE SHOCK MOUNT CONSTRUCTION
Filed March 1, 1947 — 2 Sheets-Sheet 2

INVENTOR.
Charles Eames
BY
Blair Curtis + Hayward
ATTORNEY

Patented Aug. 18, 1953

2,649,136

UNITED STATES PATENT OFFICE 2,649,136

FURNITURE SHOCK MOUNT CONSTRUCTION

Charles Eames, West Los Angeles, Calif., assignor, by mesne assignments, to Herman Miller Furniture Company, Zeeland, Mich., a corporation of Michigan Application March 1, 1947, Serial No. 731,817

10 Claims. (Cl. 155—54)

This invention relates to furniture constructions. More particularly it pertains to a combination of elements, and means for resiliently mounting panels such as the backs and seats of chairs on supporting frames or substructures. The invention applies more particularly where these panels are formed from thin sheet material having a decorative surface, such for example as molded plywood or thin metal.

There have heretofore been various attempts made to utilize plywood, thin metal and other decorative panel materials in quality furniture. In general, these efforts have resulted in failures for the reason, among others, that no satisfactory construction was known whereby an artistically molded plywood seat, for example, could be supported to withstand normal use without disfiguring the decorative surface of the plywood. For appearance and lightness plywood, and other decorative thin panel materials, are admirably suited to use in furniture, but these materials (even metals) do not withstand satisfactorily concentrated strains and stresses necessarily created in use around a supporting screw or bolt passing therethrough to hold panels securely to supporting members. The thinness of the material, its relatively low localized compressive strength, as compared with that of the bolts or screws, the slight flexing which it continually experiences in use, the relative expansions and contractions caused by temperature and moisture changes invariably tend to reduce the portions surrounding any screw head to an ever spreading detritus. Thus, in most plywood seat and back panel constructions which have gone into commercial use the otherwise ornamental wood surfaces thereof have been marred by the presence of broad headed metal bolt or screw heads, grommets, washers, and other expedients intended to prevent the various holding means from loosening, being drawn completely through, or otherwise splintering, or destroying, the portions of the plywood sheets or panels surrounding the clamped portions.

I have devised a practicable arrangement whereby a plywood or thin metal panel may be secured to a supporting substructure without resort to cutting holes or openings through the panel or of screwing into it. Such an arrangement tends to secure the panel against shock and against the destructive effects of expansion due to temperature and moisture, is free of localized strains and stresses, and may be made resilient and yielding within a wide range.

It is an object of my invention to provide a resilient furniture mount construction which can be secured to the rear or bottom face of a slightly flexible decorative seat or back panel without in any way changing or impairing the appearance of the front or exposed surface of the panel. Another object is the provision of a practicable resilient shock mount assembly which overcomes disadvantages inherent in mount assemblies heretofore known to the art. Other objects will be in part pointed out as the description proceeds, and will in part become apparent therefrom.

The invention accordingly resides in the features of construction, combinations of elements, and arrangements of parts as will be exemplified in the structures hereinafter indicated and the scope of the application of which will be set forth in the claims.

In this specification and the accompanying drawings, I have shown and described a preferred embodiment of my invention and various modifications thereof; but it is to be understood that these are not intended to be exhaustive nor limiting of the invention, but on the contrary are given for purposes of illustration in order that others skilled in the art may fully understand the invention and the principles thereof and the manner of applying it in practical use so that they may modify and adapt it in various forms, each as may be best suited to the conditions of a particular use.

In the drawings:

Figure 1 is a perspective view of a chair embodying my invention;

Figure 2 is another perspective view of the chair shown in Figure 1 illustrating certain of its rear and bottom features;

Figure 3:
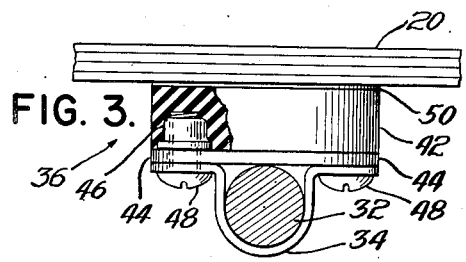
Figure 3 is a fragmentary view partly in section on an enlarged scale and with parts broken away, taken along the line 3—3 of Figure 2.
Figure 6:
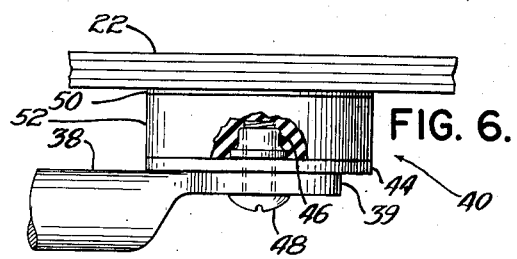
Figure 6 is a fragmentary view on an enlarged scale with parts broken away taken along the line 6—6 of Figure 2.
Figure 4:
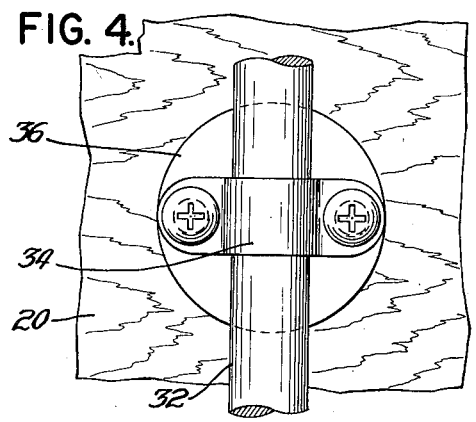
Figure 4 is a fragmentary view of the parts shown in Figure 3 taken from below.
Figure 8:
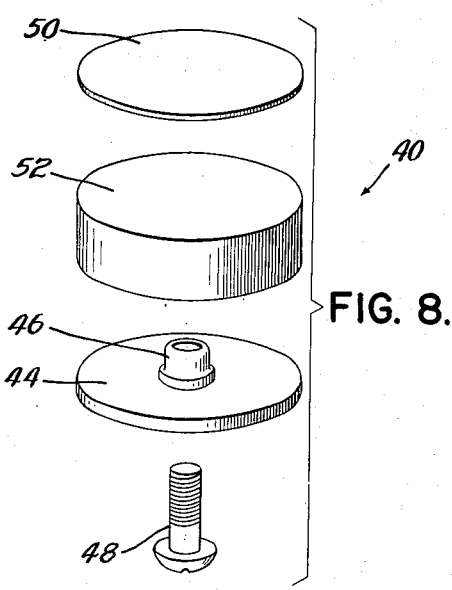

Figure 8 is an exploded perspective view of the parts which together form the shock mount of Figure 6; and Figure 9 is an enlarged detail view partly in vertical section of a modification wherein the rubber block of the shock mount is bonded directly to the panel; and Figure 10 is an enlarged detail view partly in vertical section of a shock mount wherein the rubber block is shown bonded to a seat panel and secured to a wood frame.

Figure 1 shows a chair comprising a seat panel 20, a back panel 22, legs 24, 26 and 28 and a back panel support 30.

The seat and back panels are preferably made of relatively thin molded plywood or of thin metal, and are molded or shaped to have curved sectional contours to conform comfortably to the contours of a seated person. Preferably they are sufficiently thin to bend and give with the shifting of the user and so give additional ease and comfort. Such panels are ordinarily too thin to hold screws, bolts or rivets. According to the present invention, however, they may be durably mounted on supporting frames without the use of such fastening means in direct engagement therewith.

The legs 24, 26 and 28, and post 30 provide a somewhat yielding or resilient structure satisfactorily formed from five-eighths inch diameter steel rods that are slightly flexible and hence bend resiliently under the weight of a person. As shown in Figure 2, legs 24, 26 and 28 come together beneath panel 20 into a T-shaped frame 32.

As shown in Figure 1 of my Patent No. 2,554,490 filed on the same date herewith and in Figure 10 of the drawings herein, features of the present invention are also advantageously applied to a chair having a wood frame. Whether the chair frame is of wood or metal, the seat and back panels are secured thereto through one or more shock mounts, as 36 for the seat 20, and 40 for the back 22, Figure 2; or 42 for the seat 20, Figure 9 or 42a for the seat 20, Figure 10, said mounts being secured to said frames by suitable means as by bonding, or by straps 34, or by screws 48, or the like. The chair frame shown in Figure 2 includes a cross piece 38 having two flattened end portions 39 to each of which is secured a resilient or shock mount including a rubber-like block 52, Figures 6 and 8. A back panel 22 is bonded to and resiliently and tiltably supported on said blocks to provide advantageous features in manufacture and use similar to those related to the resilient seat mount.

Figures 3, 4, 5, 9 and 10 illustrate some details of the mounts used to support the seat panel. In one illustrative embodiment, each of these mounts includes a resilient rubber or rubber-like block 42, a mounting element (shown as plate 44) made of aluminum or other suitable metal and bonded to the rubber block on one side and spaced metal nuts 46 welded to one face of the mounting plate with their threaded openings aligned with bolt receiving openings in said plate. Strap 34 may be secured to plate 44 and to the frame 32 by means of holding bolts 48 passing through said openings in plate 44 and threaded into said nuts 46 such, for example, as those known to the trade as "Elastic" stop nuts. Rubber block 42 is countersunk (see Figure 3) to provide clearance spaces or recesses for reception of said nuts so that the upper or inner face of plate 44 (see Figure 5) fits flatly against the lower or outer surface of the rubber block. The inner face of block 42, that is away from plate 44, is bonded to the panel.

Although in the embodiment illustrated in the drawings the nuts 46 are mounted on the inside face of element 44, in instances where thinner rubber-like blocks 42 are used it may be desirable to secure said nuts 46 to the outside face of element 44.

I have found it advantageous to secure a thin layer or veneer 50 of wood, cloth, or paper or plastic to the upper surface of block 42 between the block and the surface of panel 20. Such veneer should have expansion characteristics of the same order as the panel. Its presence facilitates the assembly of the block and panel, as is developed more fully hereinafter.

Figure 7:
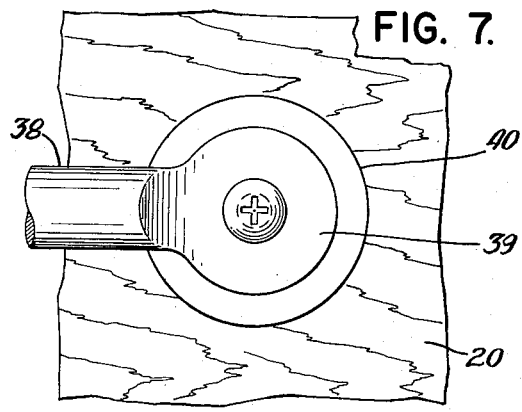
Figure 7 is a view of the parts shown in Figure 6 taken from below.
Figure 5:
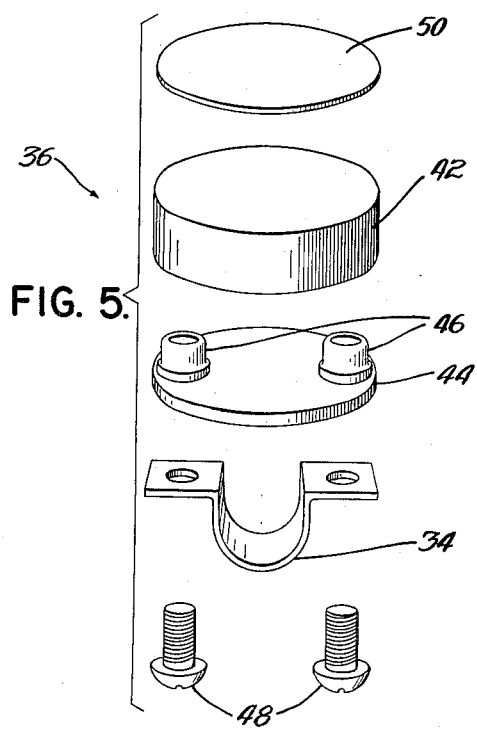
Figure 5 is an exploded perspective view of the parts which combine to form the shock mount illustrated in Figure 3.

Figures 6, 7 and 8 show the details of shock mount 40 used in supporting back panel 22. Mount 40 includes a rubber block 52, which is combined with one of the mounting plates 44 and a single stop nut 46 and holding screw or bolt 48. The upper or inner surface of the block is spaced from panel 22 by a layer of veneer 50. Block 52 differs from block 42 not only by the fact that it is countersunk or recessed to receive one stop nut instead of two, but also in that it preferably is thicker than block 42. A shock mount 36 for attaching a leg to a seat can satisfactorily be made from sheet rubber having a thickness of no more than one sixteenth of an inch although half-inch stock is usually preferred. It is desirable, however, that a back panel be more flexible in its mounting than a seat panel, and accordingly the block 52 may advantageously be one-half an inch or more in thickness.

In a completed chair I prefer to cement the shock mount, including its mounting plate 44, permanently to the rear or under surface of the supported panel. This means, for example with reference to Figure 3, that veneer 50 is permanently cemented to panel 20, block 42 is permanently cemented to veneer 50, and mounting plate 44 is permanently cemented to block 42. The chair is then assembled and disassembled from frame 32 by threading together or unthreading holding screws or bolts 48 and their stop nuts. Shock mount 36, however, once attached to panel 20, cannot be removed. With this construction, the forces which operate during use upon the legs are transmitted to the seat only through rubber blocks 42, and since these blocks are intimately bonded or cemented over a relatively substantial area to the under surface of the seat panel, no shock encountered in the ordinary use of a chair is likely to splinter or otherwise impair the seat panel, and this is true even though the panel be of a relatively frangible material. Also such shocks as are received normally are substantially absorbed by the resilient connection between the frame and the panel and are not localized at any one relatively small area of the bond between the panel and the block, and so do not set up localized strains in the plywood or metal panels.

It is to be observed that the rubber blocks of the mounts 36 and 40 are sufficiently strong both under tension and under compression, and that during normal use many of the forces which are imposed upon the blocks are forces of tension or combinations of tension and compression. Furthermore, each rubber block accommodates itself to any small surface curvature which normally is present in the molded seat or which may occur from time to time during use. Thus, even though a block be bonded to a panel surface portion which does not conform literally to the unstrained block surface, a complete surface-to-surface contact results which imposes no harmful residual stress upon the plywood. In the past attempts to glue wood or metal blocks to slightly curved or flexible plywood surfaces have had poor results because the plywood was rigidly held by the unyielding block. Thus, normal stresses were so concentrated that the plywood soon either failed or loosened from the block. The veneer 50 is so thin and flexible that it does not alter the intended advantageous functional relationship between rubber block and plywood seat or panel which would exist in its absence.

Other problems which have seriously hampered use of thin metal or plywood panels as seats and backs are overcome by the present invention. The coefficients of expansion of the panels and their contiguous supporting structures are generally different and consequently changes of temperature set up stresses between the parts which in the past have been destructive. But in the present construction the differences in expansion or contraction do no more than impose shearing strains in the intermediate rubber and by making the rubber block sufficiently thick these shearing strains cause no destruction or impairment of the bonds or of the rubber—being well within its elastic limit.

Further, the rubber blocks need not before mounting conform to the exact curvature of the panels at the areas of their joining. The plates 44 may have any desired shape to conform to the supporting frame structure or in general to the panel contours. They are constructed of material capable of withstanding high localized stresses. The intermediate rubber blocks, as 42, 52, need be shaped only generally to the contours of plate 44 and the panels in advance of bonding.

The blocks 42 may be hollowed out or may be of ring shape; it being necessary only to provide the desired yieldability and adequate bonding surfaces between the metal and rubber and between the rubber and panel. The block may be formed of any suitable composition such as rubber or other plastics having the desired yieldability and resiliency. Herein the term "rubber-like" is used to express such compositions.

The adequate bonding area is determined by the forces anticipated in use. The greater the area the less the stress per unit area between the rubber-like block and its bonds. The over-all strength of the bond need not greatly exceed the strength of the panels, but would normally equal it.

Nor do moisture conditions, normally so destructive to furniture, affect the bond included in the connecting element between the panel and legs. Moisture change causes wood to change shape, to contract and expand. But as with temperature changes, such changes of shape, contraction or expansion do no more than strain the rubber-like blocks which are designed to yield without producing destructive localized strain in the panel or bonds.

I have found that effective bonding can best be carried out if the surfaces of the rubber blocks are first etched, as with concentrated nitric acid for about five minutes. After etching, the blocks are washed and dried. To bond a veneer 50 to a rubber block I spread a thin coating of a synthetic resin on the surfaces to be brought together. One synthetic resin which I have used with success is Penacolite G 1131, components "A" and "B." Penacolite is a trade name for a synthetic resin manufactured by the Pennsylvania Coal Products Company of Detrolia, Pennsylvania. After spreading the parts with the thin synthetic resin coating, I air-dry them for three minutes and then assemble and cure them under a pressure of about seventy-five pounds per square inch and a temperature of about 220° F. Three minutes at these pressures and temperatures ordinarily are sufficient.

In order to bond plate 44 to the rubber block I scrub the metal surface with steel wool, wipe it off with toluol, wash it with soap and water, and dry it. I then spread on the metal surface of the plate a coat of Cycleweld C-3 cement and air-dry the plate for forty minutes at room temperature. Thereafter I apply a second coat of C-3 Cycleweld cement, air-dry for thirty minutes at room temperature, then bake for fifteen minutes at about 325° F. Cycleweld cement C-3 is a product of the Chrysler Corporation. Next I spread on the prepared surface of the rubber block thin coats of Penacolite G 1131 and air-dry for three minutes. I then clamp the surfaces together for three minutes under a pressure of seventy-five pounds per square inch and temperature of 220° F.

In normal operation the respective sides of the rubber block to be bonded are prepared as above described, and the veneer and metal disc are prepared, and clamped under pressure to the rubber block and simultaneously heated to the 220° F. for the three minutes.

To bond the shock mounts to the panel, the outer surface of the veneer 50 and the surface portions of the panel to which the veneer is to be cemented are sanded. I then spread on both sanded surfaces a thin coat of Urac 185, clamp the veneer and block 36 to the panel, and heat the clamped block and panel for one minute with high frequency current to bring the temperature of the Urac to 175° F. Instead of Urac I may use a cold setting adhesive such as Lauxite 77X in which event no heating is required—instead the parts are held clamped together for three hours at room temperature. Urac 185 is manufactured by the American Cyanamid Company, and Lauxite 77X is manufactured by I. F. Laucks, Inc. of Los Angeles, California.

By attaching the veneer 50 to the rubber block, as above described, the high temperature required to obtain a strong bond between rubber and wood in a relatively short time, may be utilized without subjecting the finish of the panels to such high temperature. The veneer-to-panel bond employing said cold setting adhesive does not require so high a temperature and the step of prebonding the veneer to the block therefore affords a procedure for avoiding heating the panel, when such is undesirable.

The veneer 50 may be of any construction and material permitting cold bonding thereof to the panel. Paper or cloth impregnated with bonding material may be used and bonded to the rubber and subsequently to the panel. Its strength is preferably of the order of that of the wood to which it is bonded and is selected to have the same order of expansion due to temperature change as that of the wood. When metal panels are used the veneer 50 may be eliminated as indicated in Figure 9 and where the supporting structure for the seat and back panels is wood, as described in U. S. Patent No. 2,554,490, the rubber-like blocks may be provided with the cement coating 54 and thus bonded to the panels and secured to the wood frame 32a without the metal plates 44, Figure 10. When desired also the veneer 50 may be coated on one side or face with the cold set cement at the time of fabrication, so that the purchaser or user has only to secure it to the panel by the usual procedure at room temperature.

Such rubber-like blocks employed in the furniture manufacturing art save furniture manufacturers time and equipment in fabricating furniture from panels and supporting structure. So also panels on which such blocks are mounted, supplied to furniture manufacturers save the manufacturer time and equipment. Such panels manufactured and shipped in large lots to different furniture fabricators would considerably reduce the over all cost of furniture made from such panels. The fact that the mountings are so yielding and resilient permits fabrication of different parts by different manufacturers without requiring such close tolerances as would be involved in rigid mountings.

Thus, by utilizing the above described processes which I have devised, a rubber shock mount may be secured to the underside of a panel without in any way altering the appearance of the face of the panel, and the forces necessary to pull mount 36 or 40 from the panel when so secured far exceed any force which could reasonably be expected during the life of a chair. I have tumbled a chair such as the one described herein in a tumbling mill for as long as two weeks without any indication of loosening of the bonds or damage to the plywood at or near the shock mounts.

Where detachability of the panels from the frame is not a required feature of the chair construction and where it is desirable or necessary to effect bonding of the rubber blocks to the panels without employing high temperatures, the veneers 50 are first bonded to said blocks and then the wooden frame and the panel are simultaneously glued to opposite sides thereof at relatively low temperature.

By using the shock mounts above described, to secure seat panels and back panels to a chair frame, as shown in Figure 2, the panel so mounted yields in a tilting fashion to the weight of a person sitting in the chair. For this purpose, the mounts 36 are placed sufficiently close together and so remote from the panel periphery that the seat, for example, may be tilted horizontally at any angular position around a vertical axis passing approximately through its center. The degree and kind of tilting thus afforded is not available in chair constructions wherein screws or other rigid clamping attachments pass through a relatively fragile seat panel because of the excessive localized compression and tension strains transmitted thereto by said rigid clamping devices. By locating the seat supporting shock mounts, which are also in effect resilient fulcrums, approximately in the relative positions to each other and to panel 20 as shown in Figure 2, and with edge portions of the panel widely spaced from the frame, said seat is readily and freely tiltable within the elastic limit of the block in response to body movements and therefore more comfortable than would be the case if it were rigidly supported, or if its tilting movement were limited by a rigid stop.

So also the back panel may be secured along a substantially horizontal centerline by the two mounts so as to leave the back panel free to rock or tilt about this centerline and thus adjust more readily to the conformation of the back of the seated person.

Thus, these shock mounts permit a chair construction in which seat and back panels may be secured to a relatively rigid frame in such manner as to leave the panels flexible with respect to the frame. This construction has the advantage of making the chair far more comfortable than a rigid chair, but at the same time preserves a neat appearance and enables the manufacturer to incorporate widely varying designs in the chair construction.

With the present constructions light weight relatively thin metal, plywood, or other composite seat and back panels may be used and may be curved to large degrees to provide comfort by accommodating contours of the user. The panels themselves may be so thin as to be yieldable, thereby providing further comfort. Thus with the present combinations and sub-combinations I am the first to provide inexpensive but quality chairs of unusual lightness, durability, and comfort and to provide such chairs that may be decorated as desired and which may be manufactured on a mass production basis. The elimination of structural features or elements which are ordinarily impaired by destructive forces due to temperature and moisture changes makes the chair useful for all climates and for outdoor as well as indoor use.

From the foregoing it will be observed that furniture shock mounts embodying my invention are well adapted to attain the ends and objects hereinbefore set forth and to be economically manufactured, since the separate features are well suited to common production methods and are subject to a variety of modifications as may be desirable in adapting the invention to different applications.

Since many embodiments of the invention are possible and since many changes might be made in the embodiment set forth, protection is not to be limited to anything described or presented in the above specification and drawings but only to the scope of the hereinafter attached claims.

I claim:

1. In a chair-like construction of the character described, a relatively thin plywood panel of curved sectional contour shaped to present surfaces approximating body contours of a seated person, yieldable, mounting means secured to a portion of the surface of one side of said panel and including a rubber-like block, a veneer having one surface bonded to said block and its opposite surface bonded to the panel, said veneer having expansion characteristics of the same order as said panel and being bonded to one side of the rubber-like block by cement requiring heat application and to said panel by cement requiring no heat application, a metal element capable of withstanding high localized stresses bonded to the opposite side of said rubber-like block, and a metal holding means integral with said metal element, the areas of and the strengths of the bonds between said panel, veneer, rubber-like block and element being sufficient at least to equal the strength of the panel in resisting bending beyond its elastic limit.

2. In a furniture construction of the character described: a thin panel, and shock absorbing mount means for resiliently supporting said panel comprising a plate having an extensive bonding surface, a nut mounted between said plate and said panel for connecting said plate to a framework, and a resilient block bonded to said bonding surface of said plate and to said panel over relatively extensive surfaces, whereby said panel may be resiliently supported upon said framework free of destructive stresses or strains.

3. A slightly resilient plywood seat panel, a thin nonmetalic veneer permanently secured to a relatively extensive central area of the underside of said panel by a cement which sets without heat application, the expansion characteristics of said veneer being on the same order as those of said panel, a rubber-like mounting block having a correspondingly extensive area bonded to the other side of said veneer by a cement which sets only with heat application, and a metal holding means bonded to said block.

4. A slightly resilient plywood seat panel, a plurality of thin nonmetallic veneers permanently cemented to a central area of the underside of said panel by a cement which sets without heat application and covering overall not more than one fourth of the total seat area, the expansion characteristics of each of said veneers being on the same order as those of said panel, a plurality of rubber-like mounting blocks one for each veneer, each block being permanently cemented to a veneer by a cement which sets only with heat application, and each block having bonded to it one of a plurality of metal holding means.

5. Furniture construction comprising a flexible sheet material panel of curved sectional contour, and means on one side thereof for attaching said pnel to a support, said means including a rubber block provided with a nut-receiving recess, and a nut in said recess, said block having its inner face permanently bonded to a portion of said side of the panel.

6. Furniture construction according to claim 5 and a metal plate bonded to the outer face of said rubber block, said nut being secured to said plate.

7. Furniture construction according to claim 5 and a layer of flexible sheet material interposed between and bonded to said panel and to said rubber block.

8. Furniture construction comprising a flexible sheet material panel of curved sectional contour, and means on one side thereof for attaching said panel to a support, said means including a rubber block bonded to said panel, a metal plate having an opening to receive a bolt and being bonded to the outer face of said rubber block, and a nut extending from a face of said metal plate and having its threaded opening in alignment with said plate opening.

9. In a furniture construction wherein seat and back elements including a flexible plywood panel of curved sectional contour approximately conforming to body contours of a person in seated position are resiliently supported on a chair frame, the combination of a rubber-like shock-absorbing cushioning member bonded to a portion of said panel, threaded fastening means having a portion enclosed in said member, and means cooperating with said enclosed portion for releasably securing said member in panel supporting position on said chair frame.

10. In a furniture construction the combination of a flexible panel and a shock absorbing mount for resiliently supporting said panel, said mount comprising a rubber-like shock absorbing cushioning member bonded to a portion of said panel, and means for fastening said mount and said panel on a supporting frame including a nut enclosed in said rubber-like cushioning member and a bolt having its threaded end passing through an opening in said member and into the threaded opening of said nut.

CHARLES EAMES.

References Cited in the file of this patent

UNITED STATES PATENTS

| Number | Name | Date |
|---|---|---|
| 208,820 | Hubbell | Oct. 8, 1878 |
| 1,077,200 | Maurer | Oct. 28, 1913 |
| 1,337,645 | Doman | Apr. 20, 1920 |
| 1,683,330 | Chilton | Sept. 4, 1928 |
| 1,703,297 | Chase | Feb. 26, 1929 |
| 1,802,280 | Schmitt | Apr. 21, 1931 |
| 1,827,928 | Berger | Oct. 20, 1931 |
| 2,087,253 | Herold | July 20, 1937 |
| 2,125,985 | Bond | Aug. 9, 1938 |
| 2,136,198 | Stam | Nov. 8, 1938 |
| 2,175,011 | Archer | Oct. 3, 1939 |
| 2,253,825 | Tully | Aug. 26, 1941 |
| 2,283,062 | Herold | May 12, 1942 |
| 2,308,307 | Robinson | Jan. 12, 1943 |
| 2,361,529 | Briggs | Oct. 31, 1944 |
| 2,365,334 | De Vries | Dec. 19, 1944 |
| 2,428,087 | Markus | Sept. 30, 1947 |
| 2,458,571 | Dasher | Jan. 11, 1949 |

FOREIGN PATENTS

| Number | Country | Date |
|---|---|---|
| 597,988 | France | Sept. 14, 1925 |